US011247583B2

United States Patent
Bellino et al.

(10) Patent No.: US 11,247,583 B2
(45) Date of Patent: Feb. 15, 2022

(54) BATTERY THERMAL MANAGEMENT SYSTEMS FOR PROVIDING IMPROVED BATTERY COOLING AS A FUNCTION OF VEHICLE SPEED

(71) Applicant: FORD GLOBAL TECHNOLOGIES, LLC, Dearborn, MI (US)

(72) Inventors: Mary Bellino, Dearborn, MI (US); Nicholas David Moore, Dearborn, MI (US); Joseph George, Canton, MI (US); Jordan Mazaira, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 140 days.

(21) Appl. No.: 16/541,611

(22) Filed: Aug. 15, 2019

(65) Prior Publication Data

US 2021/0046848 A1 Feb. 18, 2021

(51) Int. Cl.
*B60L 58/26* (2019.01)
*H01M 10/613* (2014.01)
*H01M 10/625* (2014.01)
*H01M 10/6568* (2014.01)
*H01M 10/635* (2014.01)

(52) U.S. Cl.
CPC .......... *B60L 58/26* (2019.02); *H01M 10/613* (2015.04); *H01M 10/625* (2015.04); *H01M 10/635* (2015.04); *H01M 10/6568* (2015.04); *B60L 2240/12* (2013.01); *B60L 2240/36* (2013.01); *H01M 2220/20* (2013.01)

(58) Field of Classification Search
CPC ... B60L 58/26; H01M 10/613; H01M 10/625; H01M 10/635; H01M 10/6568
See application file for complete search history.

(56) References Cited

U.S. PATENT DOCUMENTS

| | | | |
|---|---|---|---|
| 8,448,460 B2 | 5/2013 | Dogariu et al. | |
| 9,827,846 B2 | 11/2017 | Porras et al. | |
| 10,710,470 B2* | 7/2020 | Tominaga | B60K 11/04 |
| 10,814,700 B2* | 10/2020 | Gutowski | B60H 1/00278 |
| 10,910,680 B2* | 2/2021 | Fleming | H01M 10/443 |
| 10,960,785 B2* | 3/2021 | Villanueva | H01M 10/637 |
| 2015/0194711 A1* | 7/2015 | Rawlinson | B60L 1/02 429/62 |
| 2016/0318410 A1* | 11/2016 | Rawlinson | B60L 58/26 |
| 2016/0351981 A1 | 12/2016 | Porras et al. | |
| 2018/0154734 A1 | 6/2018 | Lee | |

(Continued)

FOREIGN PATENT DOCUMENTS

DE    4408960 C1    4/1995

*Primary Examiner* — Amanda C. Walke
(74) *Attorney, Agent, or Firm* — David B. Kelley; Carlson, Gaskey & Olds, P.C.

(57) ABSTRACT

This disclosure details thermal management systems for thermally managing electrified vehicle battery packs. An exemplary battery thermal management system may monitor the availability and effectiveness of a radiator for thermally managing a battery pack. A control unit may be configured to actuate a valve from an open position to a closed position that prevents the flow of the coolant to the radiator when a coolant temperature of the coolant exceeds a modified ambient temperature. The modified ambient temperature may be derived as a function of a vehicle speed.

20 Claims, 4 Drawing Sheets

(56) References Cited

U.S. PATENT DOCUMENTS

| | | | |
|---|---|---|---|
| 2019/0291540 A1* | 9/2019 | Gutowski | B60H 1/00385 |
| 2020/0339010 A1* | 10/2020 | Villanueva | H01M 50/20 |
| 2020/0343601 A1* | 10/2020 | Carlson | B60L 58/26 |
| 2021/0053689 A1* | 2/2021 | Lynn | B60L 58/21 |
| 2021/0061130 A1* | 3/2021 | Kumaraswamy | H01M 10/486 |
| 2021/0188043 A1* | 6/2021 | Smith | B60H 1/00428 |

* cited by examiner

BATTERY THERMAL MANAGEMENT SYSTEMS FOR PROVIDING IMPROVED BATTERY COOLING AS A FUNCTION OF VEHICLE SPEED

TECHNICAL FIELD

This disclosure relates to electrified vehicle battery packs, and more particularly to thermal management systems for thermally managing battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack may include one or more groupings of interconnected battery cells. The battery cells generate heat during certain conditions, including during charging and discharging operations. Battery thermal management systems may be employed to manage the heat generated by the battery cells.

SUMMARY

A battery thermal management system according to an exemplary aspect of the present disclosure includes, among other things, a battery pack, a radiator configured to cool a coolant for thermally managing the battery pack, a valve configured to control a flow of the coolant to the radiator, and a control unit configured to actuate the valve from an open position to a closed position that prevents the flow of the coolant to the radiator when a coolant temperature of the coolant exceeds a modified ambient temperature. The modified ambient temperature is derived as a function of a vehicle speed.

In a further non-limiting embodiment of the foregoing system, the radiator, the valve, and a pump are part of a coolant subsystem of the battery thermal management system.

In a further non-limiting embodiment of either of the foregoing systems, the coolant subsystem includes a chiller loop that includes a chiller.

In a further non-limiting embodiment of any of the foregoing systems, a refrigerant subsystem circulates a refrigerant, and the refrigerant exchanges heat with the coolant of the coolant subsystem within the chiller.

In a further non-limiting embodiment of any of the foregoing systems, the control unit is configured to divert the flow of the coolant to the chiller when the coolant temperature exceeds the modified ambient temperature.

In a further non-limiting embodiment of any of the foregoing systems, the system includes a coolant temperature sensor for monitoring the coolant temperature.

In a further non-limiting embodiment of any of the foregoing systems, the coolant temperature sensor is located between an outlet of the radiator and an inlet of the battery pack.

In a further non-limiting embodiment of any of the foregoing systems, the system includes an ambient temperature sensor for monitoring an ambient temperature.

In a further non-limiting embodiment of any of the foregoing systems, the system includes a speed sensor for monitoring the vehicle speed.

In a further non-limiting embodiment of any of the foregoing systems, the control unit includes an ambient temperature modifier high speed timer and an ambient temperature modifier low speed timer.

In a further non-limiting embodiment of any of the foregoing systems, the control unit is configured to calculate the modified ambient temperature using the ambient temperature modifier high speed timer when the vehicle speed exceeds a vehicle speed threshold and an amount of time monitored by the ambient temperature modifier high speed timer exceeds a high speed ambient time out.

In a further non-limiting embodiment of any of the foregoing systems, the control unit is configured to calculate the modified ambient temperature using the ambient temperature modifier low speed timer when the vehicle speed is less than the vehicle speed threshold and an amount of time monitored by the ambient temperature modifier low speed timer exceeds a low speed ambient time out.

In a further non-limiting embodiment of any of the foregoing systems, an ambient temperature is offset by a first offset value when the amount of time monitored by the ambient temperature modifier high speed timer exceeds the high speed ambient time out and is offset by a second, greater offset value when the amount of time monitored by the ambient temperature modifier low speed timer exceeds the low speed ambient time out.

A method according to another exemplary aspect of the present disclosure includes, among other things, controlling a flow of a coolant to a radiator of a battery thermal management system of an electrified vehicle. Controlling the flow includes allowing the flow of the coolant to the radiator when a coolant temperature of the coolant exceeds a modified ambient temperature and preventing the flow of the coolant to the radiator when the coolant temperature of the coolant is less than the modified ambient temperature.

In a further non-limiting embodiment of the foregoing method, preventing the flow of the coolant includes actuating a valve of the battery thermal management system from an open position to a closed position.

In a further non-limiting embodiment of either of the foregoing methods, the modified ambient temperature is derived as a function of a vehicle speed of the electrified vehicle.

In a further non-limiting embodiment of any of the foregoing methods, the method includes comparing the vehicle speed to a vehicle speed threshold, starting an ambient temperature modifier high speed timer when the vehicle speed is greater than the vehicle speed threshold, and starting an ambient temperature modifier low speed timer when the vehicle speed is less than the vehicle speed threshold.

In a further non-limiting embodiment of any of the foregoing methods, when the vehicle speed is greater than the vehicle speed threshold the method includes comparing an amount of time monitored by the ambient temperature modifier high speed timer with a high speed ambient time out and calculating the modified ambient temperature by adjusting an ambient temperature by a first offset value when the amount of time exceeds the high speed ambient time out.

In a further non-limiting embodiment of any of the foregoing methods, when the vehicle speed is less than the vehicle speed threshold, the method includes comparing an amount of time monitored by the ambient temperature modifier low speed timer with a low speed ambient time out and calculating the modified ambient temperature by adjusting the ambient temperature by a second offset value when the amount of time exceeds the low speed ambient time out.

In a further non-limiting embodiment of any of the foregoing methods, the second offset value is greater than the first offset value.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details thermal management systems for thermally managing electrified vehicle battery packs. An exemplary battery thermal management system may monitor the availability and effectiveness of a radiator for thermally managing a battery pack. A control unit may be configured to actuate a valve from an open position to a closed position that prevents the flow of the coolant to the radiator when a coolant temperature of the coolant exceeds a modified ambient temperature. The modified ambient temperature may be derived as a function of a vehicle speed. These and other features are discussed in greater detail in the following paragraphs of this detailed description.

Figure 1:
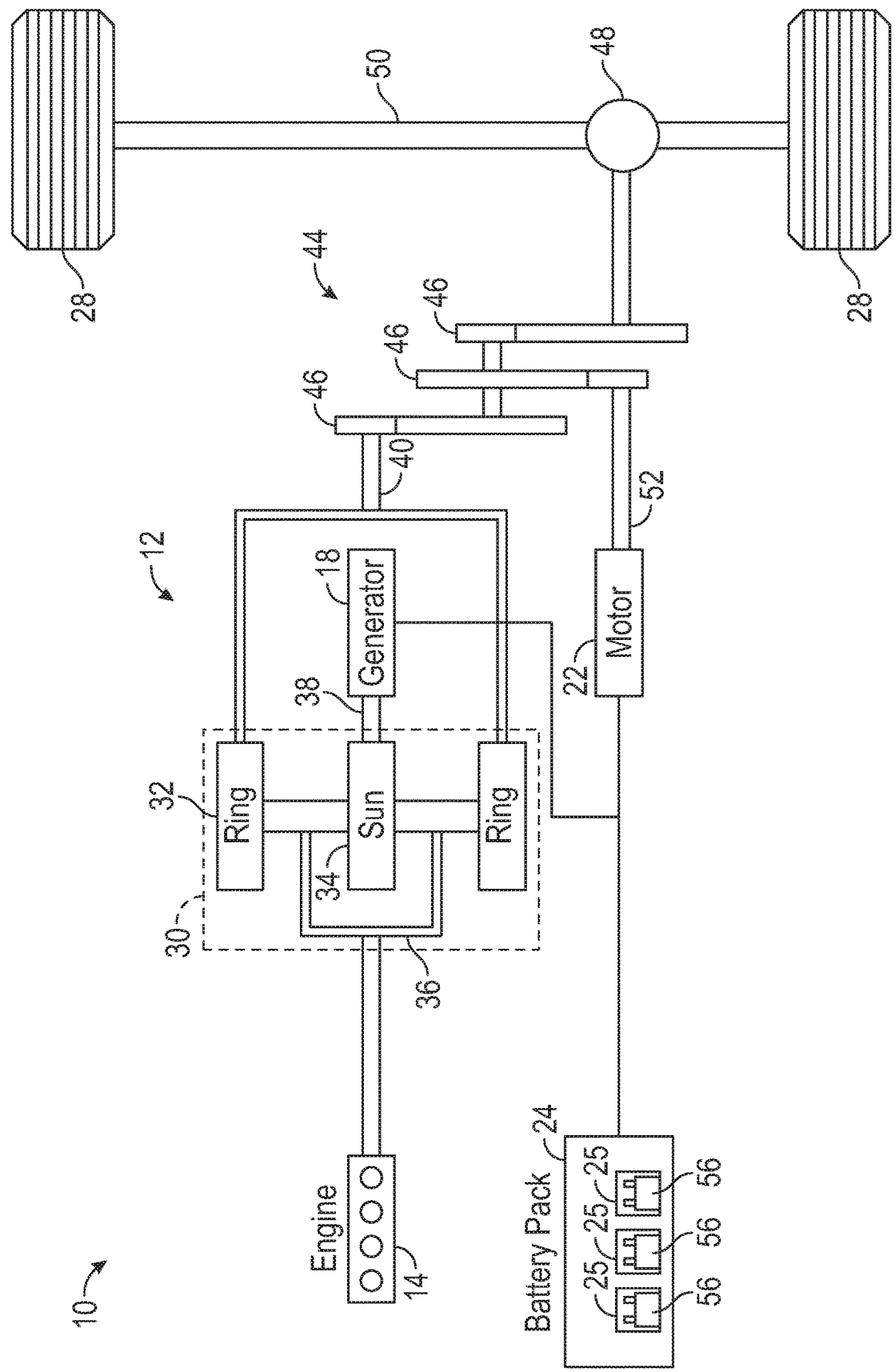
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

During certain conditions, such as battery cell charging event, battery cell discharging events, hot ambient conditions, etc., a relatively significant amount of heat can be generated by the battery cells 56 of the battery pack 24. It is desirable to manage this heat to improve the capacity and life of the battery cells 56 and therefore improve the efficiency of the battery pack 24. Systems and techniques for actively and efficiently managing this heat are therefore detailed below.

Figure 2:
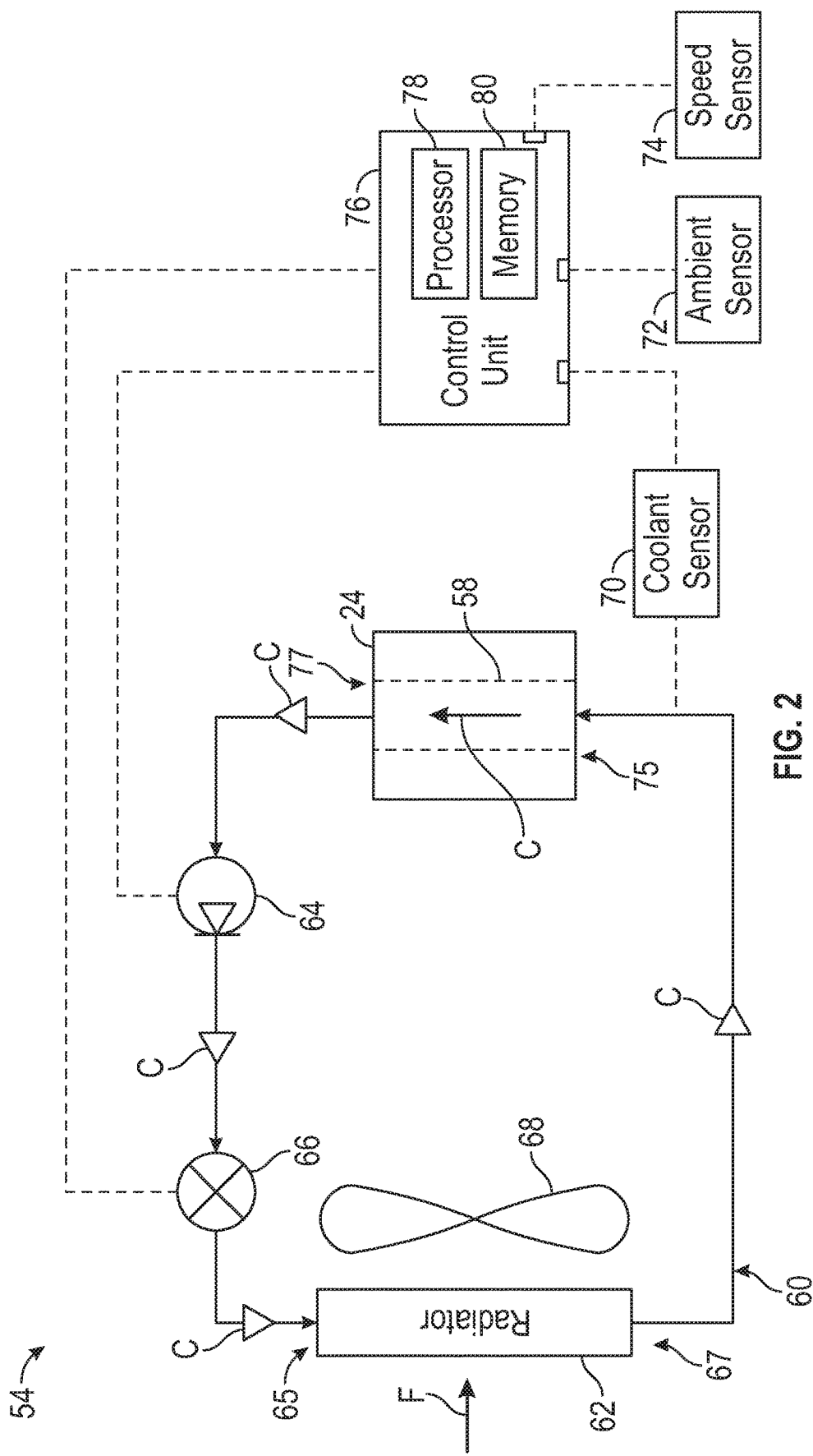
FIG. 2 illustrates a thermal management system for thermally managing a battery pack of an electrified vehicle according to a first embodiment of this disclosure.

FIG. 2 schematically illustrates a battery thermal management system 54 that can be incorporated into an electrified vehicle, such as the electrified vehicle 12 of FIG. 1. The battery thermal management system 54 may be controlled to manage the thermal load generated by various vehicle components, such as the battery pack 24 of the electrified vehicle 12. In an embodiment, the battery thermal management system 54 selectively communicates a coolant C through the battery pack 24 to cool the battery pack 24 by removing heat from the battery cells of the battery pack 24. The coolant C may be circulated through an internal cooling circuit 58 of the battery pack 24 for removing heat from the battery cells in a convective heat transfer process, for example.

The battery thermal management system 54 includes a coolant subsystem 60 for circulating the coolant C. The coolant subsystem 60, or coolant loop, circulates the coolant C, such as water mixed with ethylene glycol or any other suitable coolant, to thermally manage the battery pack 24. In an embodiment, the coolant subsystem 60 includes at least a radiator 62, a pump 64, and a valve 66. Although only schematically shown, the various components of the coolant subsystem 60 can be fluidly interconnected by conduits or passages such as tubes, hoses, pipes, etc.

During operation of the coolant subsystem 60, thermal energy is transferred from the coolant C to ambient air outside the vehicle within the radiator 62. A fan 68 may be positioned adjacent to the radiator 62 and is configured to draw an airflow F through the radiator 62 for undergoing convective heat transfer with the coolant C. For example, the airflow F exchanges heat with the coolant C as the two fluids flow across/through the radiator 62. The cooled coolant C may then be returned to the battery pack 24 for cooling the battery cells 56.

The pump 64 circulates the coolant C through the coolant subsystem 60. In an embodiment, the pump 64 is located between an outlet 77 of the battery pack 24 and an inlet 65 of the radiator 62. However, the pump 64 could be located elsewhere within the coolant subsystem 60.

The valve 66 may be controlled to either permit or prevent the flow of the coolant C back to the radiator 62 after it has been circulated through the battery pack 24. In an embodiment, the default position of the valve 66 is open to allow the coolant C to return to the radiator 62 from the battery pack 24.

The temperature of the battery pack 24 may fluctuate based on many factors, including but not limited to, vehicle speed, amp-hour usage of the battery pack 24, ambient temperatures, etc. Under relatively hot ambient conditions and depending on the current vehicle speed, the radiator 62 may become less effective at cooling the battery pack 24 because the difference between the ambient air temperature and the temperature of the coolant C entering the radiator 62 may be relatively small. This can result in the coolant C that exits an outlet 67 of the radiator 62 having the same or even a greater temperature than the coolant C that enters the radiator 62. Therefore, as discussed in greater detail below, it may be desirable to limit the usage of the radiator 62 when certain conditions are met.

The battery thermal management system 54 may additionally include a coolant temperature sensor 70 (i.e., a first sensor), an ambient temperature sensor 72 (i.e., a second sensor), and a vehicle speed sensor 74 (i.e., a third sensor). The coolant temperature sensor 70 is adapted for sensing the temperature of the coolant C after it exits the radiator 62 but before it enters the battery pack 24. In an embodiment, the coolant temperature sensor 70 is positioned at or near an inlet 75 of the battery pack 24. The inlet 75 is located downstream from the outlet 67 of the radiator 62, in this example. However, other locations are also contemplated within the scope of this disclosure.

The ambient temperature sensor 72 is configured to sense an ambient temperature, or the temperature of the ambient environment surrounding the electrified vehicle 12. The vehicle speed sensor 74 is configured to sense the speed of the electrified vehicle 10 during its operation (e.g., when keyed ON and in motion along a roadway). The ambient temperature sensor 72 and the vehicle speed sensor 74 may be located anywhere on the electrified vehicle 12.

A control unit 76 may control operation of the battery thermal management system 54. The control unit 76 could be a stand-alone control unit associated with the battery thermal management system 54 or could be part of an overall vehicle control unit, such as a vehicle system controller (VSC) that includes a powertrain control unit, a transmission control unit, an engine control unit, a battery control module, etc. It should therefore be understood that the control unit 76 and one or more other controllers can collectively be referred to as a "control unit" that is configured to control, such as through a plurality of integrated algorithms, various actuators in response to signals from various sensors associated with the battery thermal management system 54. The various controllers that make up the VSC can communicate with one another using a common bus protocol (e.g., CAN), for example.

In an embodiment, the control unit 76 is programmed with executable instructions for interfacing with and operating the various components of the battery thermal management system 54 for thermally managing the heat generated by the battery pack 24. The control unit 76 may include various inputs and outputs for interfacing with the various components of the battery thermal management system 54, including but not limited to the battery pack 24, the pump 64, the valve 66, the coolant temperature sensor 70, the ambient temperature sensor 72, and the vehicle speed sensor 74. The control unit 76 may further include a processing unit 78 and non-transitory memory 80 for executing the various control strategies and modes of the battery thermal management system 54.

In an embodiment, the control unit 76 is configured to control the battery thermal management system 54 such that the radiator 62 is used to perform heat transfer between the coolant C and the ambient airflow F only when it is determined that the radiator 62 is capable of decreasing the temperature of the coolant C. The control unit 76 may receive feedback from each of the coolant temperature sensor 70, the ambient temperature sensor 72, and the vehicle speed sensor 74 for determining whether, via the valve 66, the coolant C is permitted to flow into the radiator 62 or not.

As discussed in greater detail below, the position of the valve 66 may be controlled by the control unit 76 to limit the usage of the radiator 62 based on a difference between the ambient temperature sensed by the ambient temperature sensor 72 and the coolant temperature sensed by the coolant temperature sensor 70. The effectiveness of the radiator 62 may further be a function of the vehicle speed sensed by the vehicle speed sensor 74. Using calibrated timers, the control unit 76 is configured to determine whether the sensed vehicle speed is a sufficient speed to provide a cooling benefit for a minimum period of time by calculating modified ambient temperatures that more accurately reflect the operative environment of the electrified vehicle 12.

Figure 3:
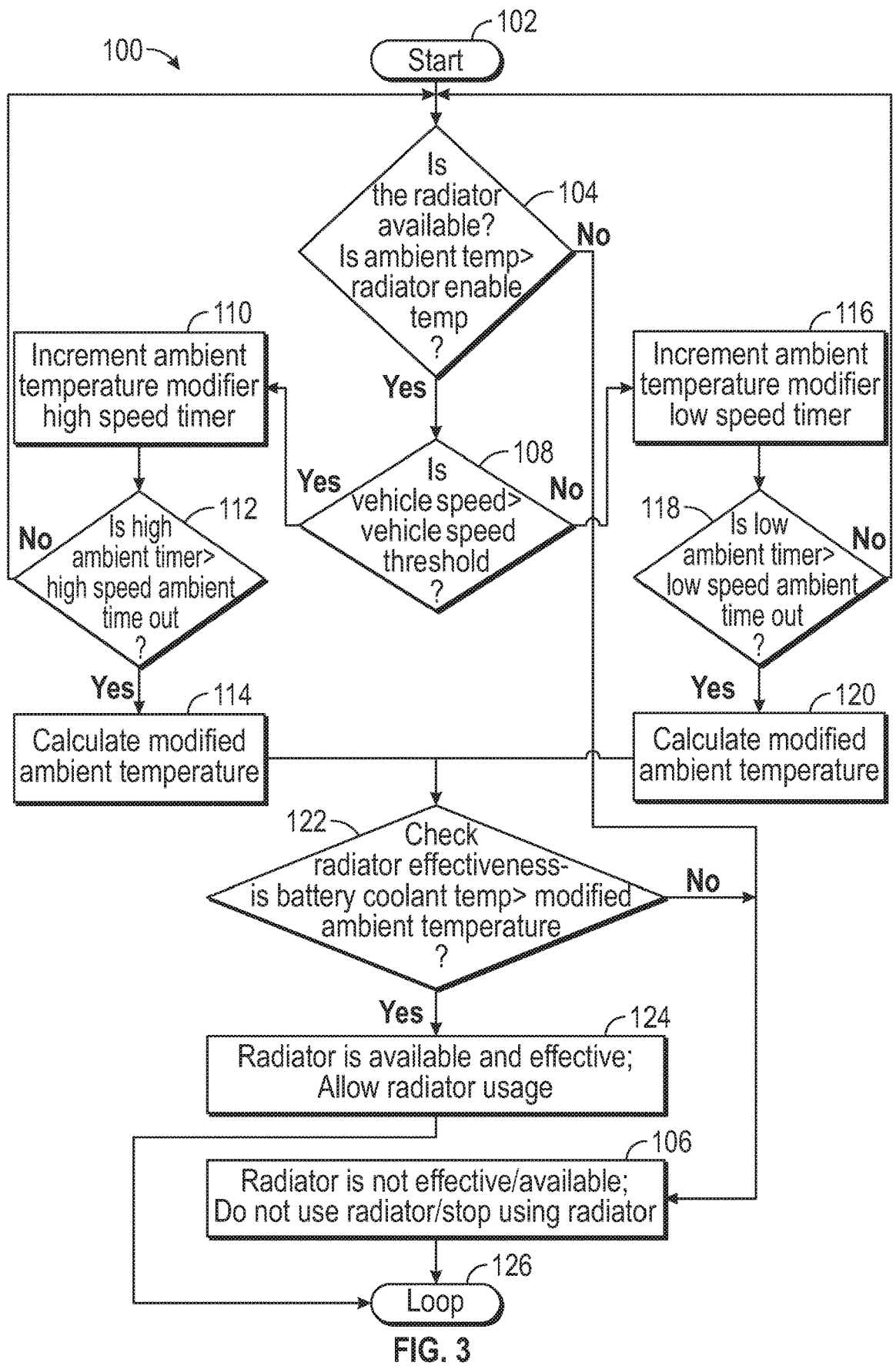
FIG. 3 schematically illustrates a method of controlling a battery thermal management system for effectively thermally managing an electrified vehicle battery pack.

FIG. 3, with continued reference to FIGS. 1-2, schematically illustrates an exemplary method 100 for controlling the battery thermal management system 54 of the electrified vehicle 12. For example, the method 100 may be a control strategy that is executed to determine whether or not the radiator 62 of the battery thermal management system 54 is capable of effectively lowering the temperature of the coolant C circulating within the coolant subsystem 60 at any given point of time during vehicle operation. In an embodiment, the control unit 76 is programmed with one or more algorithms adapted to execute the exemplary method 100, or any other control strategy. In another non-limiting embodiment, the method 100 is stored as executable instructions (e.g., software code) in the memory 80 of the control unit 76.

The method 100 may begin at block 102. At block 104, the control unit 76 may determine whether the radiator 62 is currently available for cooling the coolant C of the coolant subsystem 60 by determining whether the current ambient temperature sensed by the ambient temperature sensor 72 is greater than a radiator enable temperature. The radiator enable temperature is a predefined temperature value or range of temperature values that may be stored in the memory 80 of the control unit 76. In an embodiment, the radiator enable temperature is a temperature between 0 degrees C. (32 degrees F.) and 20 degrees C. (68 degrees F.).

If a NO flag is returned at block 104, the method 100 proceeds to block 106, at which point the radiator 62 is determined to be unavailable for use. The radiator 62 is therefore not used to thermally manage the battery pack 24. The control unit 76 may actuate the valve 66 from a default open position (i.e., a first position) to a closed position (i.e., a second position) to prevent the coolant C from flowing to the radiator 62 when the radiator 62 is determined to be unavailable for use. The control unit 76 may optionally command the pump 64 OFF when the radiator 62 is determined to be unavailable for use.

Alternatively, if a YES flag is returned at block 104, the method 100 proceeds to block 108. At this step, the control unit 76 may determine whether the current vehicle speed sensed by the vehicle speed sensor 74 is greater than a vehicle speed threshold. The vehicle speed threshold is a predefined speed value or range of speed values that may be programmed in the memory 80 of the control unit 76. In an embodiment, the vehicle speed threshold is between about 10 miles per hour (+/−2 miles per hour) and about 30 miles per hour (plus/minus 2 miles per hour).

If a YES flag is returned at block 108, the method 100 proceeds to block 110. Alternatively, the method 100 may proceed to block 116 if a NO flag is returned at block 108.

Assuming first that a YES flag has been returned at block 108, the control unit 76 may start an ambient temperature modifier high speed timer at block 110. The ambient temperature modifier high speed timer is a calibrated timer of the control unit 76 and is configured to monitor an amount of time the vehicle speed is maintained above the vehicle speed threshold. The time tracked by the ambient temperature modifier high speed timer is compared to a high speed ambient time out at block 112. In an embodiment, the high speed ambient time out is between 30 seconds and 120 seconds. If the time monitored by the ambient temperature modifier high speed timer exceeds the high speed ambient time out, a modified ambient temperature is calculated at block 114. The modified ambient temperature may be calculated by applying a first offset value to the ambient temperature that is sensed by the ambient temperature sensor 72. In an embodiment, the first offset value may be added to the ambient temperature and could be between 2 degrees C. and 3 degrees C. at higher speeds or between 6 degrees C. and 10 degrees C. when the vehicle 10 is at a stop.

Assuming instead that a NO flag has been returned at block 108, the control unit 76 may start an ambient temperature modifier low speed timer at block 116. The ambient temperature modifier low speed timer is another calibrated timer of the control unit 76 and is configured monitor an amount of time the vehicle speed is maintained below the vehicle speed threshold. The time tracked by the ambient temperature modifier low speed timer is compared to a low speed ambient time out at block 118. In an embodiment, the low speed ambient time out is between 30 seconds and 120 seconds. If the time monitored by the ambient temperature modifier low speed timer exceeds the low speed ambient time out, a modified ambient temperature is calculated at block 120. The modified ambient temperature may be calculated by applying a second offset value to the ambient temperature that is sensed by the ambient temperature sensor 72. In an embodiment, the second offset value is added to the ambient temperature. In another embodiment, the second offset value is a smaller offset value than the first offset value because the ambient temperature readings of the ambient temperature sensor 72 are generally considered less accurate at lower speeds.

The method 100 may proceed to block 122 from either block 114 or block 120. At block 122, the control unit 76 may estimate the current effectiveness of the radiator 62. The current effectiveness of the radiator 62 may be estimated by comparing the coolant temperature of the coolant C (obtained from the ambient temperature sensor 72) to the modified ambient temperature (obtained at either block 114 or block 120). If the coolant temperature exceeds the modified ambient temperature, the radiator 62 is determined to be effective for cooling the battery pack 24 at block 124 and its usage is therefore permitted by maintaining the valve 66 in the open position. Alternatively, if the coolant temperature is less than the modified ambient temperature, the radiator 62 is determined to be currently ineffective for cooling the battery pack at block 106 and its usage is prevented by actuating the valve 66 to a closed position.

As schematically illustrated by the "loop" block 126, the method 100 described above may be continuously performed during operation of the electrified vehicle 12 in order to continuously monitor the availability and effectiveness of the radiator 62 for thermally managing the battery pack 24.

Figure 4:
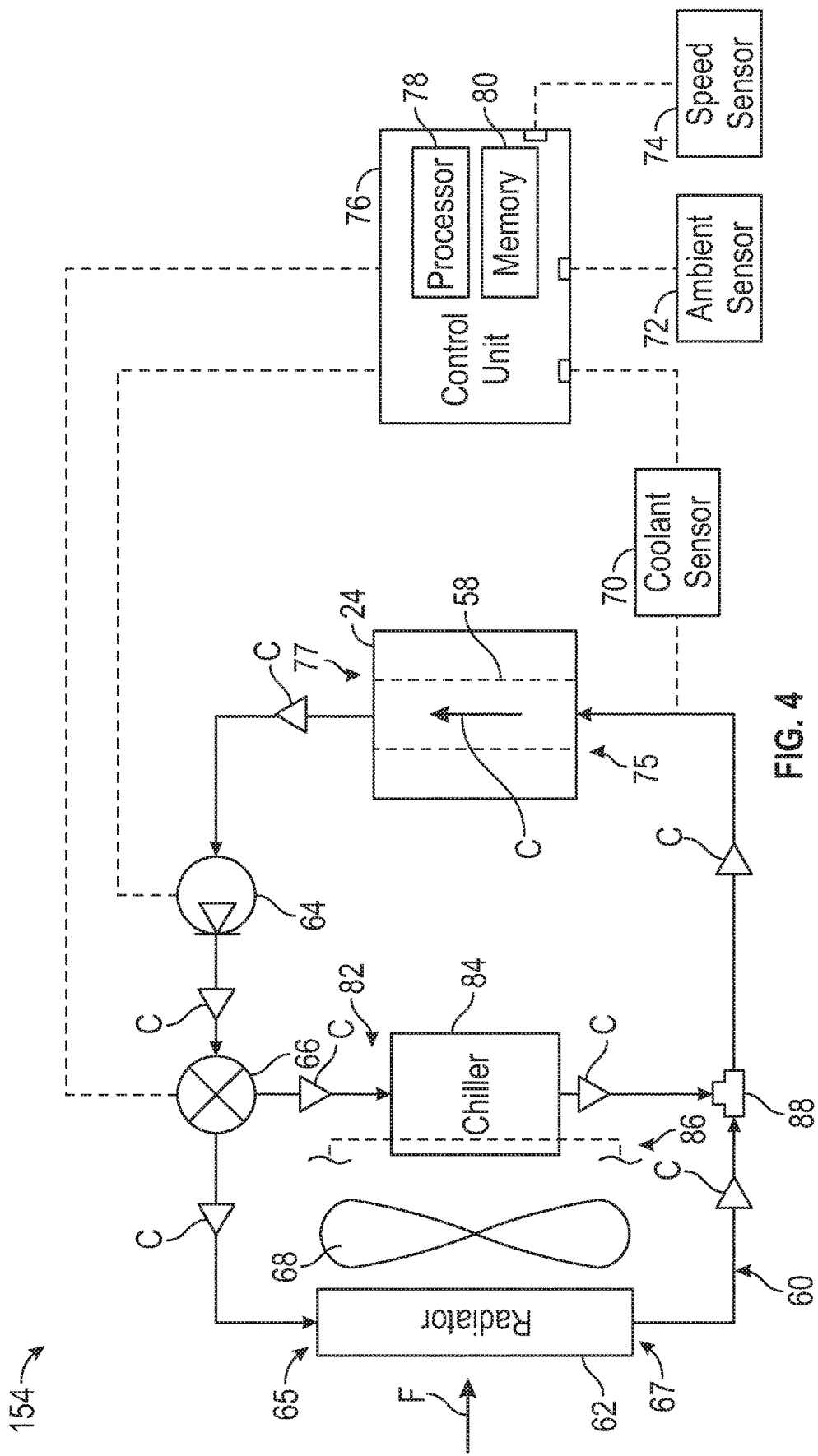
FIG. 4 illustrates a thermal management system according to another embodiment of this disclosure.

FIG. 4 schematically illustrates another exemplary battery thermal management system 154. The battery thermal management system 154 is similar to the battery thermal management system 54 of FIG. 2. However, in this embodiment, the coolant subsystem 60 of the battery thermal management system 154 includes a chiller loop 82. The chiller loop 82 may include a chiller 84 configured to cool the coolant C during certain conditions.

The valve 66 may control a flow of the coolant C to either the radiator 62, the chiller 84, or both. Coolant C that enters the chiller loop 82 may be communicated through the chiller 84 where it exchanges heat with a refrigerant of a refrigerant subsystem 86. In other words, the chiller 84 facilitates the transfer of thermal energy between the chiller loop 82 and the refrigerant subsystem 86. In an embodiment, the refrigerant subsystem 86 is a refrigerant loop that circulates refrigerant to transfer thermal energy to or from a passenger cabin (not shown) of the electrified vehicle 12 and/or to or from the chiller loop 82.

The method 100 of FIG. 3 may be performed on the battery thermal management system 154 to determine whether or not the radiator 62 is currently available and effective for transferring a sufficient amount of thermal energy from the coolant C to ambient air in order to effectively cool the battery pack 24. In situations where the radiator 62 is determined to be ineffective for this purpose, the chiller loop 82 can be employed to either completely provide or assist with the cooling. In an embodiment, the valve 66 can be controlled to divert the flow of the coolant C to the chiller 84 rather than to the radiator 62. Chilled coolant C exiting the chiller 84 may be directed to a three-way valve 88 and then to the battery pack 24 for cooling the battery pack 24.

The exemplary battery thermal management systems of this disclosure continuously monitor radiator cooling effectiveness as a function of modified ambient temperatures, coolant temperatures, and vehicle speeds. The systems provide improved fuel economy by reducing chiller running times, improve component reliability by reducing valve toggling, and prolonged battery life due to lower average temperatures over the life cycle of the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery thermal management system, comprising:
a battery pack;
a radiator configured to cool a coolant for thermally managing the battery pack;
a valve configured to control a flow of the coolant to the radiator; and
a control unit configured to actuate the valve from an open position to a closed position that prevents the flow of the coolant to the radiator when a coolant temperature of the coolant is less than a modified ambient temperature,
wherein the modified ambient temperature is derived as a function of a vehicle speed.

2. The system as recited in claim 1, wherein the radiator, the valve, and a pump are part of a coolant subsystem of the battery thermal management system.

3. The system as recited in claim 2, wherein the coolant subsystem includes a chiller loop that includes a chiller.

4. The system as recited in claim 3, comprising a refrigerant subsystem that circulates a refrigerant, said refrigerant exchanging heat with the coolant of the coolant subsystem within the chiller.

5. The system as recited in claim 3, wherein the control unit is configured to divert the flow of the coolant to the chiller when the coolant temperature is less than the modified ambient temperature.

6. The system as recited in claim 1, comprising a coolant temperature sensor for monitoring the coolant temperature.

7. The system as recited in claim 6, wherein the coolant temperature sensor is located between an outlet of the radiator and an inlet of the battery pack.

8. The system as recited in claim 1, comprising an ambient temperature sensor for monitoring an ambient temperature.

9. The system as recited in claim 1, comprising a speed sensor for monitoring the vehicle speed.

10. The system as recited in claim 1, wherein the modified ambient temperature is an ambient temperature that is offset by an offset value.

11. The system as recited in claim 10, wherein the offset value is between 2 degrees C. and 3 degrees C.

12. The system as recited in claim 10, wherein the offset value is between 6 degrees C. and 10 degrees C.

13. The system as recited in claim 1, wherein the control unit is configured to derive the modified ambient temperature by comparing the vehicle speed to a vehicle speed threshold.

14. The system as recited in claim 13, wherein the control unit is configured to start an ambient temperature modifier high speed timer when the vehicle speed is greater than the vehicle speed threshold.

15. The system as recited in claim 13, wherein the control unit is configured to start an ambient temperature modifier low speed timer when the vehicle speed is less than the vehicle speed threshold.

16. The system as recited in claim 1, wherein the control unit is configured to infer that the radiator is ineffective to cool the battery pack when the coolant temperature is less than the modified ambient temperature.

17. A battery thermal management system, comprising:
a battery pack;
a radiator configured to cool a coolant for thermally managing the battery pack;
a valve configured to control a flow of the coolant to the radiator; and
a control unit configured to actuate the valve from an open position to a closed position that prevents the flow of the coolant to the radiator when a coolant temperature of the coolant is less than a modified ambient temperature,
wherein the modified ambient temperature is derived as a function of a vehicle speed, wherein the control unit includes an ambient temperature modifier high speed timer and an ambient temperature modifier low speed timer.

18. The system as recited in claim 17, wherein the control unit is configured to calculate the modified ambient temperature using the ambient temperature modifier high speed timer when the vehicle speed exceeds a vehicle speed threshold and an amount of time monitored by the ambient temperature modifier high speed timer exceeds a high speed ambient time out.

19. The system as recited in claim 18, wherein the control unit is configured to calculate the modified ambient temperature using the ambient temperature modifier low speed timer when the vehicle speed is less than the vehicle speed threshold and an amount of time monitored by the ambient temperature modifier low speed timer exceeds a low speed ambient time out.

20. The system as recited in claim 19, wherein an ambient temperature is offset by a first offset value when the amount of time monitored by the ambient temperature modifier high speed timer exceeds the high speed ambient time out and is offset by a second, greater offset value when the amount of time monitored by the ambient temperature modifier low speed timer exceeds the low speed ambient time out.

* * * * *